United States Patent [19]

Amirsakis

[11] Patent Number: 4,695,604
[45] Date of Patent: Sep. 22, 1987

[54] ELECTRON BEAM CURABLE POLYUETHANE POLYMERS FOR MAGNETIC TAPE APPLICATIONS

[75] Inventor: Charles J. Amirsakis, Lake Geneva, Wis.

[73] Assignee: Morton Thiokol, Inc., Chicago, Ill.

[21] Appl. No.: 692,444

[22] Filed: Jan. 16, 1985

[51] Int. Cl.$^4$ .................. C08L 75/06; C08L 33/08
[52] U.S. Cl. .................. 525/28; 522/96; 528/25
[58] Field of Search .......... 528/75; 522/96; 525/28

[56] References Cited

U.S. PATENT DOCUMENTS

| Re. 29,131 | 2/1977 | Smith | 522/96 |
|---|---|---|---|
| 3,654,347 | 4/1972 | Kincaid | 528/75 |
| 3,719,638 | 3/1973 | Huemmer | 528/75 |
| 3,779,995 | 12/1973 | Danniels . | |
| 4,203,875 | 5/1980 | Garner . | |
| 4,264,757 | 4/1981 | Park | 528/75 |
| 4,284,750 | 8/1981 | Amirsakis | 528/79 |
| 4,380,604 | 4/1983 | Neuhaus et al. | 522/96 |
| 4,399,239 | 8/1983 | Herwig | 578/75 |
| 4,400,497 | 8/1983 | Blum . | |
| 4,408,020 | 10/1983 | Kolycheck | 528/75 |
| 4,415,630 | 11/1983 | Kubota | 428/403 |
| 4,446,286 | 5/1984 | Kolycheck et al. | 522/96 |
| 4,467,078 | 8/1984 | Kolycheck . | |
| 4,485,226 | 11/1984 | Noll et al. | 522/96 |
| 4,496,686 | 1/1985 | Ansel | 522/96 |
| 4,507,188 | 3/1985 | Chu | 522/96 |

OTHER PUBLICATIONS

Kirk-Othmer, *Encyclopedia of Chemical Technology*, 3rd Ed., vol. 14, pp. 732–753 (1981).

*Primary Examiner*—Allan M. Lieberman
*Attorney, Agent, or Firm*—George Wheeler; Gerald K. White

[57] ABSTRACT

Electron beam curable polyurethane resin comprising the reaction product of a hydroxyl terminated polyester; a compound having ethylenic unsaturation and at least 2 hydroxyl moieties; optionally, a chain extender which is a lower aliphatic or cycloaliphatic diol; and an approximately stoichiometric proportion of an aliphatic, cycloaliphatic, or aromatic diisocyanate. The ethylenically unsaturated component has an essentially aliphatic backbone, and optionally can include carbamate linkages. Magnetic coatings incorporating these resins are adapted to be applied to a substrate, calendared, then crosslinked by exposure to electron beam radiation. Magnetic media made with such coatings are also disclosed. The present resins, and coatings made from them, have superior properties to other coatings of this type.

19 Claims, No Drawings

ELECTRON BEAM CURABLE POLYUETHANE POLYMERS FOR MAGNETIC TAPE APPLICATIONS

TECHNICAL FIELD

The present invention relates generally to electron beam curable polyurethane compositions, particularly such compositions for binding magnetizable particles to a substrate to form a magnetic recording medium such as an audio or video tape or another medium for storage of magnetic impulses

BACKGROUND ART

Magnetic recording media consist of a base film or support covered with a magnetic coating. The magnetic coating is a hardened dispersion of particles of a magnetizable mineral in a polyurethane resin composition. Small amounts of other additives such as lubricants, dispersants, conductive agents, and the like (further specified below) also form part of the magnetic coating composition.

Most present magnetic coatings require crosslinking after they are applied to the support. This is usually accomplished by adding a polyfunctional isocyanate crosslinking agent to the magnetic coating before deposition on the support. After deposition and drying to remove the solvent, the tape is wound or otherwise stored, then aged for one or two days to allow crosslinking to take place. An overview of the ingredients, physical and chemical properties, and manufacture of conventional magnetic media can be found in Kirk-Othmer, *Encyclopedia of Chemical Technology*, 3rd Edition, Vol. 14, pages 732–753, John Wiley and Sons (New York, 1981).

There are two important disadvantages to the above stated method of manufacturing magnetic media. First, the chemical crosslinking reaction between the polyurethane resin and polyfunctional isocyanates is considered to be the most critical and difficult step to control during the production of a magnetic medium. This difficulty arises because the solvents, magnetizable mineral, and ambient atmosphere each contain variable amounts of water. The reaction of water with the isocyanate moieties of the crosslinking agent is favored over the reaction of isocyanates with organic hydroxyl groups to crosslink the coating. As a result of the interfering reaction with water, crosslinking often is not complete and the resulting magnetic tape coating can be of poor quality.

A collateral disadvantage of chemical crosslinking is that the medium must be stored for a substantial length of time to complete the crosslinking reaction. The tape must be stored under very carefully controlled conditions to prevent it from blocking during the crosslinking reaction.

One solution to the problems of chemical crosslinking has been to devise a magnetic coating which does not require crosslinking in order to provide acceptable properties. U.S. Pat. No. 4,284,750, issued to the present inventor on Aug. 18, 1981, describes such a composition.

Another solution proposed to resolve the chemical crosslinking problem has been to provide polyurethane compositions which can be induced to crosslink using actinic radiation, and particularly electron beam radiation. Two patents suggesting electron beam crosslinkable polyurethane tape coatings are U.S. Pat. No. 4,408,020, issued to Kolycheck on Oct. 4, 1983, and U.S. Pat. No. 4,415,630, issued to Kubota, et al. on Nov. 15, 1983.

Electron beam or radiation curable polyurethane compositions are suggested for other utilities in the following patents:

| U.S. Pat. No. | Inventor | Issued |
| --- | --- | --- |
| Re 29,131 | Smith, et al | Feb. 2, 1977 |
| 3,654,347 | Kincaid, et al | Apr. 4, 1972 |
| 3,719,638 | Huemmer, et al | March 6, 1973 |
| 4,264,757 | Park | Apr. 28, 1981 |
| 4,399,239 | Herwig, et al | Aug. 16, 1983 |

Various chemically cured polyurethanes are taught in the following patents:

| U.S. Pat. No. | Inventory | Issues |
| --- | --- | --- |
| 3,779,995 | Dannels, et al | Dec. 18, 1973 |
| 4,203,875 | Garner, et al | May 20, 1980 |
| 4,400,497 | Blum, et al | Aug. 23, 1983 |

The compositions disclosed in the listed patents generally lack one or more of the essential properties of a binder for the high quality magnetic tape coatings now required. First, to minimize friction between the ultimate recording medium and the recording or playback heads, the binder must have a yield point of greater than 3,000 psi (2069 N/m$^2$) and a Young's Modulus of greater than 50,000 psi (34,500 N/m$^2$) at temperatures between about 20° and 80° Celsius. Second, the binder should have a high ultimate strength and hardness, and should be capable of elongating at least about 130% before breaking. To provide these properties, the finished coating should be highly crosslinked, meaning that it should have a high gel fraction. The resinous portion of the coating should have a weight average molecular weight of at least 80,000, a glass transition temperature ($T_g$) of at least 30° Celsius when crosslinked, and the crosslinked magnetic coating should have a $T_g$ so high that it is never exceeded during ordinary use of the magnetic medium. The finished tape should have good resistance to blocking. Additionally, the uncured magnetic coating should be capable of being applied with conventional coating apparatus (which requires that the coating be rapidly dried), contain a high loading of well-dispersed magnetizable mineral, and be capable of being calendared before the coating is crosslinked. The coating should have a viscosity of roughly 1,000 to 5,000 cps, whether containing a reactive or nonreactive solvent. Furthermore, the coatings should not shrink substantially upon drying, and must be capable of adhering both to the magnetizable coating and to the substrate.

Prior electron beam curable compositions have not been capable of providing recording media having all the required properties. It is thus one principal object of this invention to provide an electron beam curable magnetic tape coating, binder, and finished magnetic tape which are easily processed and provide all the necessary chemical and physical properties.

SUMMARY OF THE INVENTION

One aspect of the present invention is a substantially uncrosslinked polyurethane composition which is capable of being crosslinked by an electron beam. The composition comprises the reaction product of a hydroxyl terminated polyester; an unsaturated compound having two available hydroxyl moieties and at least one available site of ethylenic unsaturation in a pendant moiety; optionally, an aliphatic diol which functions as a chain extender; and an organic diisocyanate in sufficient quantity to provide stoichiometric proportions of available hydroxyl and isocyanate moieties.

In the above compositions, the unsaturated compound has a structure selected from:

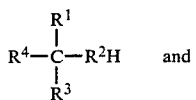  Structure I

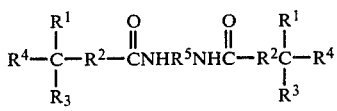  Structure II wherein
$R^1$ is a moiety having the structure:

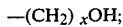

$R^2$ is a moiety having the structure:

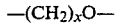

wherein the oxygen atom is part of a carbamate linkage in structure II;
each x can be independently be 0, 1, or 2;
$R^3$ is a moiety having the structure:

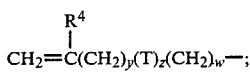

T is selected from carbonyl and ether linkages;
y is 0 or 1;
z is 0 or 1;
w is 0, 1, or 2;
$R^4$ is selected from —H and —$CH_3$;
or $R^3$ and $R^4$ together form a divalent ring-forming moiety having the structure:

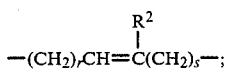

r and s are independently 0, 1, 2, or 3, and
$R^5$ is an aliphatic hydrocarbon moiety having from about 6 to about 36 carbon atoms.

A second aspect of the present invention is an electron beam crosslinkable magnetic coating comprising a dispersion of a particulate magnetizable material in the composition set forth above.

In another aspect of the invention, a magnetic coating as just described dispersed in a solvent carrier is provided.

A fourth aspect of the invention is a magnetic recording medium comprising a substrate and a magnetic coating as just described. The coating in a solvent carrier is deposited on the substrate, the carrier is removed, and the dry coating is exposed to electron irradiation, thereby crosslinking the coating.

DESCRIPTION OF THE PREFERRED EMBODIMENTS

The polyurethane compositions described herein comprise a hydroxy terminated polyester; an unsaturated compound as more fully characterized in the Summary section above; optionally a diol chain extender; and an organic diisocyanate. These components are described in the stated order below.

Hydroxyl Terminated Polyester

The hydroxyl terminated polyesters contemplated herein constitute from about 34 to about 75 per cent by weight of the composition (all percentages mentioned herein are by weight except as noted). These are polymerized reaction products of alpha-omega dicarboxylic acids and lower alkyl diols. The acid component has from about 4 to about 12 carbon atoms; preferred acids include adipic acid, azelaic acid and 1,12-dodecanedioic acid or mixtures thereof.

The diol components contemplated herein as inqredients of polyesters include aliphatic and cycloaliphatic alpha-omega hydroxyl terminated diols. The aliphatic diols can have an aliphatic chain length of from about 2 to about 10 carbon atoms and can be branched or unbranched. Specific diols contemplated herein are 1,4-butanediol, 1,6-hexanediol, ethylene glycol, and propanediol. Other species having from two to ten carbon atoms, preferably from two to six carbon atoms, and specified in the paragraph bridging Columns 2 and 3 of the previously cited Kolycheck patent are also operable herein. Cycloaliphatic diols, for example cyclohexane-1,4-dimethanol, are also operable herein.

Several preferred polyester species contemplated herein are the reaction product of 1,4-cyclohexane dimethanol with a dicarboxylic acid selected from adipic acid, azelaic acid, 1,12dodecanedioic acid or mixtures thereof; the reaction products of 1,4-butanediol and the same selection of dicarboxylic acids; and the reaction products of 1,6-hexanediol and the selected dicarboxylic acids.

A further characteristic desired for the hydroxyl terminated polyesters contemplated herein is a hydroxyl number range of from about 30 to about 300. The "hydroxyl number" of a single compound is defined as follows:

(hydroxyl number) = (56,100) (equivalents of —OH per mole)/(molecular weight)

The hydroxyl number (abbreviated "HN") of a composition is the weighted average of the hydroxyl numbers of its individual components, and is given by the relation:

$$HN = (Hn_1)f_1 + (hn_2)f_2 + \ldots + (hn_x)f_x$$

wherein "hn" is the hydroxyl number and "f" is the fraction by weight of each component in the composition.

The contemplated polyesters are synthesized by reacting the acid and diol, usually under a nitrogen atmosphere, in the presence of an esterification catalyst. Some catalysts in general use are derivatives of tin, such as stannous oxalate, stannous octoate, dibutyl tin oxide, dibutyl tin dilaurate, stannous chloride, and stannous fluoride.

Unsaturated Compound

The unsaturated compound contemplated for use herein is described generically in the preceding Summary section, and may constitute from about 5 to about 22% by weight of the composition. Its essential components are two reactive hydroxyl moieties and at least one pendant site of ethylenic unsaturation, for example, an allyl or vinyl moiety.

One class of such unsaturated compounds has the formula:

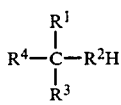

wherein $R^1$, $R^2$, $R^3$, and $R^4$ are defined as noted in the Summary section. Exemplary unsaturated compounds meeting this definition include glyceryl allyl ether:

$$CH_2-CH-CH_2O-CH_2-CH=CH_2.$$
$$\phantom{CH_2-}|\phantom{CH-}|$$
$$\phantom{CH_2-}OH\phantom{-}OH$$

Another compound meeting the above description is 2,3-dihydroxypropyl methacrylate:

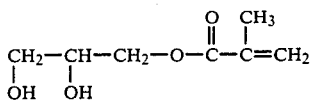

This compound has been successfully synthesized, but it is unstable and polymerizes spontaneously in a few hours.

Another contemplated unsaturated compound which has been synthesized but is unstable is 2,3-dihydroxypropyl acrylate:

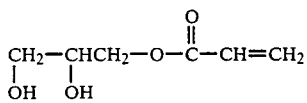

The latter two compounds, if stabilized successfully, are expected to be equivalent to the others in the present compositions.

A second category of unsaturated compounds useful herein is represented by the following formula:

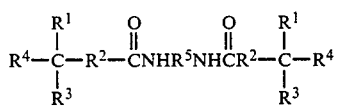

The latter compounds each have two sites of unsaturation and two hydroxyl moieties. These compounds are formed by reacting unsaturated compounds of the first type set forth above with a long chain aliphatic diisocyanate having an aliphatic chain length of from about 6 to about 36 carbon atoms. ($R^5$ represents the residue of the aliphatic chain.) A representative diisocyanate is a diisocyanate-terminated dimer of oleic acid, commercially available from Henkel Corporation, Minneapolis, Minnesota, under the trade name "DDI 1410".

One preferred unsaturated compound of this second type is one in which $R^1$ is a hydroxy group, $R^2$ is an oxymethylene moiety, $R^3$ is a moiety having the following structure:

$$CH_2=CHCH_2OCH_2-;$$

$R^4$ is a hydrogen moiety; and $R^5$ is the aliphatic nucleus of the diisocyanate-terminated dimer of oleic acid described above. Synthesis of this structure is demonstrated in the Examples portion of this specification.

Another unsaturated compound of the second type is one in which $R^1$ is a hydroxy moiety ($x=0$); $R^2$ is an oxymethylene moiety as before; $R^3$ has the structure:

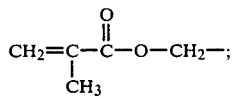

and $R^4$ on the main nucleus is a hydrogen moiety.

Other organic compounds containing two hydroxyl moieties and a pendant ethylenically unsaturated moiety which are contemplated herein include the following:
1,1-bis(allyloxymethyl)-1,1-dimethylolmethane;
1,1-bis(5-hexenyloxymethyl)-1,1-dimethylolmethane;
1,1-diallyl-1,1-dimethylolmethane;
4-methyl-3-cyclohexene-1,1-dimethanol;
3-cyclohexene-1,1-dimethanol;
3-allyloxy-1,5-pentanediol;
3-allyloxy-1,2-propanediol;
2-(allyloxymethyl)-2-methyl-1,3-propanediol;
2-vinyl-1,3-propanediol;
2-(allyloxyethyl)-1,3-propanediol;
and the like.

In the preferred polyurethane composition, the identities and proportions of the polyester and the unsaturated compound are such that the hydroxyl number of the combination is from about 100 to about 350.

Diol Chain Extender

Optionally, a hydroxy terminated chain extender can be added to the polyurethane composition as from about 0 to 14 per cent of the composition to increase the molecular weight of the uncrosslinked polymer. The chain extender can be selected from a wide variety of aliphatic and cycloaliphatic diols. For example, any of the diols mentioned previously as components of polyesters within the scope of the invention can be used as chain extenders. Specific aliphatic and cycloaliphatic chain extenders contemplated herein are as follows:
ethylene glycol
propylene glycol
1,4—butanediol
1,5—pentanediol
1,6—hexanediol
1,4—cyclohexanedimethanol Aromatic chain extenders are also contemplated; an example is hydroquinone di(beta-hydroxyethyl) ether, more properly known as para-di-(2-hydroxyethoxy)-benzene. Other diol chain extenders are also contemplated, comprising an essentially linear structure having terminal hydroxy moieties connected to an aliphatic portion having from two to ten carbon atoms, optionally interrupted by a cycloaliphatic or aromatic ring. Other chain extenders known to the art are also contemplated for use herein.

Diisocyanate

A wide variety of diisocyanates are known, and are contemplated for use herein. The contemplated diisocyanates may be aliphatic, aromatic, or cycloaliphatic, and may be unsubstituted or substituted by heteroatoms such as halogen, oxygen, nitrogen, or the like. Most of the patents cited in the Background Art section of the present specification list a wide variety of diisocyanates; each of those patents is hereby incorporated herein by reference to show the wide variety of operable diisocyanates. The proportion of diisocyanate can be from about 18 to about 44 per cent of the composition; a stoichiometric quantity is preferred.

Specific diisocyanates which have been found particularly useful are the following:
methylene-bis-diphenyl diisocyanate (MDI);
tetramethylene diisocyanate;
hexamethylene diisocyanate;
cyclohexyl diisocyanate;
phenyl diisocyanate;
toluene diisocyanate;
dichlorodiphenylmethane diisocyanate;
dimethyldiphenylmethane diisocyanate;
diphenyldimethylmethane diisocyanate;
dibenzyldiisocyanate;
diphenyl ether diisocyanate.

Modifiers

An optional reactant which can be used to improve the properties of polyurethanes made according to the present invention is from about 2 to about 50 per cent by weight of a material referred to herein as a modifier. One class of modifiers useful herein is that of urethane acrylate compounds. One example is the reaction product of trimethylol propane, toluene diisocyanate or methylene-bis-diphenyl diisocyanate, and 2-hydroxyethyl acrylate. The structure of the preferred urethane acrylate compound is as follows:

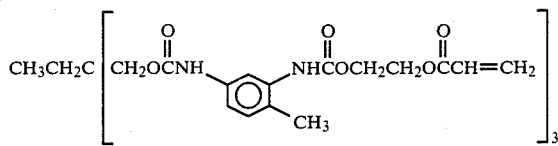

Another class of modifiers useful herein is that of phenoxy resins. The structure, molecular weight, flow temperature, and preparation of phenoxy resins is disclosed in column six, lines 39–65 of U.S. Pat. No. 4,408,020, which is hereby incorporated herein by reference.

If used, the function of the modifier is to increase the Young's Modulus and yield point of the resulting polyurethane resin.

Polyurethane Formation Catalysts

Catalysts can be used to speed up the polyurethane formation reaction, and any catalyst normally used by those skilled in the art may be employed. Typical catalysts include dibutyltin dilaurate, stannous octoate, tertiary amines such as triethylamine and the like, normally in amounts from about 0.01 to 10 percent of the urethane composition, more normally from about 0.025 to about 5 percent by weight. Other catalysts useful herein are stannous oxalate and triethylenediamine.

Preparation of Polyurethane and Resin Compositions

While various reaction schemes are contemplated within the scope of the invention for forming a polyurethane composition from the reactants described above, a procedure which has been found useful is as follows. First, the hydroxyl terminated polyester is formed by reacting the selected acid and diol components in the presence of a selected catalyst under a nitrogen atmosphere. Separately, if one of the unsaturated compounds of the type containing urethane linkages is to be incorporated as an ingredient of the polyurethane resin, this component is formed by reacting the selected diol compound and the selected diisocyanate in a 2:1 ratio in the presence of the selected catalyst for urethane formation. In still another reaction, the selected modifier is formed (if desired). Modifiers of the phenoxy resin type are prepared as described in the patent previously incorporated by reference. Urethane acrylate modifiers are prepared by reacting the precursors described previously under a nitrogen atmosphere in the presence of the urethane formation catalyst.

To prepare the polyurethane resin the polyester, chain extender (if used), and unsaturated compound are blended together, the diisocyanate selected for the reaction is added and mixed into the composition, and the composition is then cured in an oven to provide an uncrosslinked, high molecular weight, solid polyurethane resin composition which is capable of being crosslinked by electron beam radiation.

If a modifier is incorporated in the resin, this is done by dissolving the resinous composition described in the preceding sentence in four times its weight of tetrahydrofuran, and adding to the solution the selected modifier. The solvent then can be removed or can be used as the vehicle for coating. More details of the resin preparation process are set forth in the example portion of this specification.

Ingredients of Magnetic Coating

The magnetic coatings contemplated herein are dispersions of a magnetizable mineral (often called a pigment) and an uncrosslinked polyurethane resin. In the preferred coatings which are adapted for use with conventional tape coating machinery, these two main ingredients are carried in a solvent vehicle. Lubricants, wetting agents, coupling agents, and other ingredients are also added to the tape coating compositions to modify the properties thereof.

The pigments contemplated herein include gamma-ferric oxide, doped iron oxide, chromium dioxide; metallic particles such as elemental iron, cobalt, and nickel; and combinations of those materials. One commercial gamma iron oxide is Pfizer 2228 HC, available from Pfizer, Inc., Minerals, Pigments, and Metals Division, New York City, New York. The amount of the magnetic pigment is controlled by the desire to include a high loading level to increase the output of the magnetic tape, moderated by the desire to minimize the effects of overloading, particularly shedding of the coating due to loss of cohesion. A typical magnetic coating contains from about 40 to 55 percent by volume of the magnetic pigment.

The polyurethane resin binder contemplated herein is described previously in the specification. The preferred magnetic coating typically contains about 30 to about 35 percent by volume of this polyurethane binder.

A typical magnetic coating contains from about 2 to about 10 percent by volume of a dispersant. Dispersants are added to encourage the separation of agglomerates of magnetic particles, which provides the best possible performance of the tape. Known dispersants include lecithin, organic esters of phosphoric acid, quaternary ammonium compounds, and various surfactants, such as sulfosuccinates, fatty acids and esters, and lignin sulfonic acids.

A small amount of a coupling agent such as titanium dioxide may be added to the magnetic coating composition. The coupling agent can be added, if desired, at a level of roughly from about 0.5 to about 3 percent by weight of the magnetic powder. The use of such coupling agents is disclosed in U.S. Pat. No. 4,415,630, which was previously cited.

A lubricant may be incorporated as from about 2 to about 8 percent by volume of the magnetic tape composition to reduce the friction between the tape and the surfaces it contacts when in use, particularly the recording and playback heads. Typical lubricants include fatty acids and esters; silanes; glyceryl esters; fatty acid amides; hydrocarbons (for example squalene); and silica. The lubricant typically comprises from about 2 to about 8 percent by volume of the magnetic coating.

To prevent static charge buildup, some tape formulations include a conductive pigment or agent as up to 10 percent of the magnetic coating. The conductive pigment lowers the resistivity of gamma-ferric oxide tapes from an untreated value of $10^{10}$–$10^{14}$ ohms per square to a treated value of from about $10^5$–$10^8$ ohms per square. The usual antistatic agent is carbon black.

Two other optional additives, generally not comprising more than about 3 percent by volume of the magnetic coating composition, include mild abrasives such as silica, alumina, or chromia (added to provide continuous cleaning of the recording and playback heads) and fungicides (added if required to control mildew).

Solvent Vehicle

While it is contemplated that coatings can be developed which can be directly applied to a substrate, in current magnetic medium manufacturing processes a solvent is used to reduce the viscosity of the magnetic coating and to dissolve the resinous binder so the magnetic coating can be applied to a substrate. The desired solvent or solvent system should be capable of dissolving the resinous binder and dispersing the other ingredients of the magnetic coating. Commonly employed solvents include tetrahydrofuran, cyclohexanone, methyl ethyl ketone, methyl isobutyl ketone, and toluene. The other components of a magnetic coating are dissolved or dispersed in about 4 times their weight of the solvent system, the exact amount being adjusted to provide a desirable viscosity for the selected coating process. The preferred solvents are tetrahydrofuran, toluene, or a mixture of those solvents.

Magnetic Tape and Its Manufacture

The magnetic coatings contemplated herein are useful in conventional manufacturing processes wherein the coating is dispersed in a solvent and applied to a substrate, usually a sheet of polyethylene terephthalate. The tape is then oriented by being passed through a magnetic field, dried in an oven, calendared, and wound on a parent roll, and later is unwound, slit, and rewound on product reels. Two important processing differences created by use of the present, electron beam curable coatings are as follows. First, an electron beam curing step is added to the process following the calendaring step. The coating can conveniently be irradiated by running the coated substrate continuously through an electron beam. Conventional electron beam sources can be used to irradiate coatings; about 7 megarads (Mrads) of irradiation is generally adequate to crosslink these coatings.

The other difference in the manufacturing methods applicable to the present magnetic coatings is that, because the coating is electron beam crosslinked instead of chemically crosslinked, there is no need to age the parent rolls in order to effect crosslinking. Consequently, a manufacturing line can be devised in which an electron beam curing field immediately follows the calendar rolls, and the slitting and rewinding on consumer rolls can take place as further steps of the basic manufacturing process. Since current manufacturing processes are operable, however, it should be emphasized that such changes to current manufacturing systems are not necessary to achieve the benefits of the present invention.

EXAMPLES

The examples which follow illustrate how resins, magnetic coatings, and magnetic tape or other media according to the present invention can be made, and the properties of the resulting products. These examples illustrate the invention but do not define it. The invention is defined by the claims following these examples. Procedures A–C common to several examples are listed immediately below, followed by the examples.

Procedure A. Preparation of hydroxyl terminated polyester

For convenience in manufacturing, the following two hydroxyl terminated polyester masterbatches were prepared from the indicated ingredients, according to the following procedure.

| Polyester Masterbatches | |
|---|---|
| Ingredients | Batch 1A |
| 1,4-cyclohexane dimethanol | 1440 g (10.0 moles) |
| Adipic Acid | 817.6 g (5.6 moles) |
| Azelaic Acid | 451.2 g (2.4 moles) |
| Catalyst (Stannous oxalate) | 0.5 g |
| Acid number | 0.3 |
| Hydroxyl Number | 81.00 |
| Ingredients | Batch 1B |
| 1,4-cyclohexane dimethanol | 2304 g (16.0 moles) |
| Adipic Acid | 817.6 g (5.6 moles) |
| Azelaic Acid | 451.2 g (2.4 moles) |
| Catalyst (Stannous oxalate) | 0.5 g |
| Acid number | 1.15 |
| Hydroxyl Number | 244.33 |

Into a suitable reactor, equipped with a sealed stirrer, nitrogen inlet and two connected reflux condensers, the molten (80°–90° C.) 1,4-cyclohexanedimethanol was added under constant stirring. To the stirred mass, 817.6 gms (5.6 moles) of adipic acid and 451.2 gms (2.4 moles) of azelaic acid were added together with 0.5 gms of stannous oxalate catalyst. Purging with nitrogen was begun. Steam was fed to the first condenser and cold water to the second one while raising the temperature of the mixture to about 225° C. and continuously removing water formed during the condensation reaction. The reaction was allowed to proceed at this temperature for about four hours, after which time the batches were allowed to cool to about 165° C. and the nitrogen supply was discontinued. A vacuum of less than 10 mm of mercury was drawn and the reaction was allowed to continue for five hours at 165° C. while removing the remaining water of condensation. At the end of this time, the batches were cooled to about 100° C.

Procedure B. Preparation of unsaturated compounds

Into a suitable reactor equipped with a sealed stirrer, nitrogen inlet, and thermometer, 1800 gms (6 equivalents) of Henkel Corporation "DDI 1410" diisocyanate were added with constant stirring. Nitrogen purging was begun. To the stirred mass, 792 gms (12 equivalents) of glyceryl allyl ether and 20 gms of a catalyst solution consisting of 11.00 gms triethylenediamine, 1.25 gms dibutyl tin dilaurate and 87.75 gms of N-methyl-2-pyrrolidone were added. After the exotherm reached a temperature of about 35° C., cooling with cold water was begun to maintain the batch temperature between 45°–50° C. The reaction was carried out for a period of 8.0 hours. The resultant product had a viscosity of 750 cps at 70° C., a hydroxyl number of 130 and was essentially free of residual isocyanate as indicated by the absence of an IR peak at 2270 cm$^{-1}$. Its structure is believed to be substantially as follows:

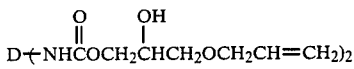

wherein D is the 36 carbon residue of Henkel Corporation "DDI 1440" diisocyanate between its terminal diisocyanate moieties.

Procedure C. Preparation of urethane acrylate modifier

Into a jacketed reactor equipped with a stirrer, a nitrogen inlet, thermometer and a reflux condenser, 475.26 gms of an isocyanate terminated intermediate prepared from the reaction of equimolar proportions of trimethylol propane and toluene diisocyanate were added while constantly stirring. To the stirred mass, 173.66 gms of toluene and 57.73 gms of tetrahydrofuran were added. Purging with nitrogen was begun and the batch temperature was adjusted to 25°–30° C. 12.73 gms of a 15% solution of triethylenediamine dissolved in N-methyl-2-pyrrolidone and 172.75 grams of 2-hydroxyethylacrylate were then added dropwise over a period of 185 minutes. At the end of this period, the batch temperature was raised to 30°–35° C. and the reaction was continued for an additional 90.0 minutes. The resultant product had the following properties:

% Solids — 61.8
Viscosity (Brookfield) — 950 cps at 25° C.
Residual NCO — Essentially none as indicated by the absence of IR peak at 2270 cm$^{-1}$

EXAMPLE 1

The polyester masterbatches 1A and 1B of Procedure A were blended to a hydroxyl number of 100. 1227 gms of this polyester blend were then admixed with 156.94 gms of 1,4-butanediol and with 216.06 gms of the organic compound of Procedure B to yield 1600 gms of a polyester-polyol blend having a hydroxyl number of 216.5. To this entire polyol blend 763.9 gms of diphenylmethane-4,4'-diisocyanate (MDI) were added. The ingredients were thoroughly mixed and then cured in an oven at 120° C. for one hour.

EXAMPLE 2

100.00 gms of the product of Example 1 were dissolved in 400.0 gms tetrahydrofuran. To this solution 16.2 gms of the product of Procedure C were added.

EXAMPLE 3

100.0 gms of the product of Example 1 were dissolved in tetrahydrofuran (THF). To this solution 48.54 gms of the product of Procedure C (urethane acrylate modifier) were added. The resulting electron beam curable composition had a viscosity of about 1230 cps when measured at 25° C. with a Brookfield Viscometer.

EXAMPLE 4

The polyester masterbatches 1 A and 1 B were blended to a hydroxyl number of 150. 848.32 gms of this polyester blend were then admixed with 85.12 gms of 1,4-butanediol and 666.56 gms of the organic compound of Procedure B to yield 1600 gms of a polyester polyol blend having a hydroxyl number of 200.0. To this entire polyol blend there were added 710 gms of MDI. The ingredients were thoroughly mixed and then cured in oven at 120° C. for one hour.

EXAMPLE 5

100.0 gms of the product of Example 4 were dissolved in 400.0 gms of THF. To this solution 48.54 gms of the urethane acrylate modifier of Procedure C were added.

EXAMPLE 6

The polyester masterbatches 1 A and 1 B were blended to a hydroxyl number of 200. 1191.84 gms of this polyester blend were then admixed with 125.76 gms of 1,4-butanediol and 282.40 gms of the organic compound of Procedure B to yield 1600 gms of a polyester polyol blend having a hydroxyl number of 270. To this entire polyol blend were added 958 gms of MDI. The ingredients were thoroughly mixed and then cured in oven at 120° C. for one hour.

EXAMPLE 7

100.0 gms of the product of Example 6 were dissolved in 400.0 gms of THF. To this solution, 40 gms of the urethane acrylate modifier of Procedure C were added.

EXAMPLE 8

1106.88 gms of polyester masterbatch 1 B were admixed with 173.12 gms of 1,4-butanediol and 320.0 gms of the organic compound of Procedure B to yield 1600.0 gms of a polyester polyol blend having a hydroxyl number of 330. To this entire polyol blend there were added 1171 gms of MDI. The ingredients were thoroughly mixed and then cured in oven at 120° C. for one hour.

EXAMPLE 9

100.0 gms of the product of Example 8 were dissolved in 400 gms of tetrahydrofuran. To this solution 30.0 gms of the urethane acrylate modifier of Procedure C were added.

EXAMPLE 10

1289.92 gms of the polyester Masterbatch 1 A were admixed with 310.08 gms of glyceryl allyl ether to yield 1600.0 gms of a polyester polyol blend having a hydroxyl number of 230. To this entire polyol blend there were added 817 gms of MDI. The ingredients were thoroughly mixed and then cured in an oven at 125° C. for one hour.

EXAMPLE 11 — PROPHETIC EXAMPLE 2,3-dihydroxypropyl acrylate has been synthesized in pure form, but has been found to polymerize spontaneously within a few hours, and so far is too unstable to use. This example demonstrates what reaction is expected, assuming 2,3-dihydroxypropyl acrylate can be stabilized.

Procedure D

Into a suitable reactor equipped with sealed stirrer, nitrogen inlet and a thermometer, 900 gms (3 equivalents) of DDI 1440 diisocyanate are added with constant stirring. Nitrogen purging is begun. To the stirred mass, 438.0 gms (6 equivalents) of 2,3-dihydroxypropyl acrylate and 20.0 gms of a catalyst solution consisting of 11.0 grams of triethylene diamine, 1.25 grams of dibutyltin dilaurate and 87.75 gms of N-methyl-2-pyrrolidone are added. After the exotherm reaches a temperature of about 35° C., cooling with cold water is begun and the temperature is maintained between 45°–50° C. for a period of 8.0 hours. The resultant product is expected to have a hydroxyl number of 125.78 and should be essentially free of residual NCO (as indicated by the absence of IR peak at 2270 cm$^{-1}$).

Procedure E

The polyester masterbatches 1 A and 1 B previously described are blended to a hydroxyl number of 100.00. 1054.88 gms of this polyester blend are then admixed with 158.72 gms of 1,4-butanediol and 386.40 gms of the organic compound of Procedure D. The resulting product is 1600 gms of a polyester polyol blend having a hydroxyl number of 220. To this entire polyol blend are added 784.3 gms of MDI. The ingredients are thoroughly mixed and then cured in an oven at 120° C. for one hour.

EXAMPLE 12 —PROPHETIC EXAMPLE 2,3-dihydroxypropylmethacrylate has been synthesized in pure form, but has been found to polymerize spontaneously within a few hours, and so far is too unstable to use. This example demonstrates what reaction is expected, assuming 2,3-dihydroxypropyl methacrylate can be stabilized.

Procedure F

Into a suitable reactor equipped with a sealed stirrer, nitrogen inlet and a thermometer, 900 gms (3 equivalents) of DDI 1440 diisocyanate are added with constant stirring. Nitrogen purging is begun. To this stirred mass are added 480.0 gms (6 equivalents) of 2,3-dihydroxypropyl methacrylate and 20.0 gms of a catalyst solution consisting of 11.0 gms triethylene diamine, 1.25 gms dibutyltin dilaurate and 87.75 gms of N-methyl-2-pyrrolidone. After the exotherm reaches a temperature of about 35° C., cooling with cold water is begun and the mixture is maintained at a temperature range of 45–50° C. for a period of 8.0 hours. The resultant product is expected to have a hydroxyl number of 121.96 and is expected to be essentially free of residual NCO as indicated by the absence of an IR peak at 2270 cm$^{-1}$.

Procedure G

The polyester masterbatches 1 A and 1 B are blended to a hydroxyl number of 100.0. 1064.80 grams of this polyester blend are then admixed with 160.32 gms of 1,4-butanediol and 374.88 gms of the organic compound of Procedure F to yield 1600 gms of a polyester polyol blend having a hydroxyl number of 220. To this entire polyol blend are added 784.3 gms of MDI. The ingredients are thoroughly mixed and then cured in an oven at 120° C. for a period of one hour.

EXAMPLE 13 —PROPHETIC EXAMPLE 0.0 gms of the product of Example 12 are dissolved in tetrahydrofuran and to this solution 20.0 gms of the urethane acrylate modifier of Procedure C are added.

EXAMPLE 14

289.12 gms of a hydroxy terminated polyester having a hydroxyl number of 41.1 and derived from the reaction of adipic acid with 1,4-butanediol were admixed with 128.0 gms of 1,4-butanediol and 182.88 gms of glyceryl allyl ether to yield 1600 gms of a polyester polyol blend having a hydroxyl number of 230.0. To this entire polyol blend were added 809.5 gms of MDI. The ingredients were thoroughly mixed and then cured in an oven at 20° C. for a period of one hour. The resulting electron beam curable compositions had a viscosity of 1850 cps when measured as a 20% solution in tetrahydrofuran.

EXAMPLE 15

100.0 gms of the product of Example 14 were dissolved in tetrahydrofuran and to this solution 20.0 gms of the urethane acrylate modifier of Procedure C were added. The resulting electron beam curable composition (20% in tetrahydrofuran) had a viscosity of about 1850 cps when measured at 25° C. with a Brookfield Viscometer.

EXAMPLE 16

1271.04 gms of a hydroxy terminated polyester having a hydroxyl number of 51.0 and derived from the reaction of adipic acid with 1,6-hexanediol ("Millester 16-55," sold by Polyurethane Specialties Co., Lyndhurst, New Jersey) were admixed with 140.64 gms of 1,4-butanediol and 188.32 gms of glyceryl allyl ether to yield 1600.0 gms of a polyester polyol blend having a hydroxyl number of 250.0. To this entire polyol blend were added 888.5 gms of MDI. The ingredients were thoroughly mixed and then cured in an oven at 120° C. for a period of one hour.

EXAMPLE 17

100.0 gms of the product of Example 16 were dissolved in tetrahydrofuran and to this solution 20.0 gms of the urethane acrylate modifier of Procedure C were added.

EVALUATION OF POLYURETHANE RESINS

Most of the polyurethane resins of Examples 1–17 were evaluated with respect to the following:
1. hardness;
2. solubility characteristics of the crosslinked polymer films;
3. mechanical properties of crosslinked polymer films;
4. thermomechanical properties of crosslinked polymer films;
5. molecular weight and molecular weight distribution of polymer samples prior to electron beam (EB) irradiation;

6. mechanical properties of crosslinked magnetic tape coatings having oxide:resin weight ratios of 3:1 and 5:1 respectively;
7. solubility characteristics of crosslinked magnetic tape coatings having oxide:resin weight ratios of 3:1 and 5:1 respectively; and
8. blocking characteristics of crosslinked magnetic tape coatings having an oxide:resin weight ratio of 5:1.

Hardness

The hardnesses of the polyurethane resins of Examples 1-17 were determined in accordance with ASTM Method D-2240-75, using "D" and "A" durometer scales (indicated as "D" or "A" adjacent each value in Table I).

Molding Procedure For Hardness Samples

The following equipment was assembled:
A. Buehler Specimen Mount Press No. 20-1310(obtained from Buehler Ltd., Evanston, IL 60104)
B. Mold Assembly — Buehler No. 20-2121.
C. Automatic Heater — Buehler No. 20-2223.
D. Cooler — Buehler No. 20-2314.
E. Stop Watch.
F. Teflon Mold Release Spray.

After making sure that the mold was clean and dry, mold release was sprayed on all inside surfaces of the mold and allowed to dry. 10 grams (±0.5) of the sample to be molded was weighed and put into the mold; the mold was closed. The heater was placed around the mold, then they were placed in the press. The heater was turned on and the press was maintained between 200-500 psi (138-345 N/m$^2$) pressure until the temperature reached 350° F. (177° C.). When 350° F. was attained, the pressure was increased to 5000 psi (3448 N/m$^2$) in increments of 1500 psi (1034 N/m$^2$). Temperature and pressure were maintained for 10 minutes ±2. Then the heater was removed and the mold was cooled to room temperature under pressure. The mold was then disassembled and the sample was removed. The molded samples were allowed to sit at room temperature at least three days before commencing testing.

TABLE I

| Example | Hardness |
|---|---|
| 1 | 64D |
| 2 | 65D |
| 3 | 73D |
| 4 | 70D |
| 5 | 72D |
| 6 | 70D |
| 7 | 65D |
| 8 | 74D |
| 9 | 78D |
| 10 | 68D |
| 14 | 80A |
| 15 | 78A |
| 16 | 80A |
| 17 | 86A |

SOLUBILITY CHARACTERISTICS OF POLYMER FILMS

The solubility of each exemplary crosslinked resin was evaluated by measuring its gel fraction, which is the fraction of the sample remaining undissolved when an attempt is made to extract it with boiling solvent. The gel fraction is an indication of the extent of radiation-induced crosslinking in the sample. A high gel fraction is therefore desirable.

The following equipment was located: a source of electron beam radiation capable of delivering a 7 Mrad dose to the test samples; release paper; a drawdown bar; a Soxhlet extraction apparatus (including sample thimbles, a 250 ml round bottom boiling flask, and a reflux condenser; a heating mantle for the flask; boiling chips; and rotary evaporation apparatus.

Uncrosslinked samples of each resin to be tested were dissolved in dimethylformamide to form a 25% solution. The solution was coated on the release paper at a wet thickness of 15 mils (0.38 mm) with the drawdown bar. The coated release paper was placed in a forced-air oven at 60° C.: the temperature was then raised to 100° C. and maintained at that level for one hour to dry the sample. The sample was then irradiated with 7 Mrads of electron beam radiation and removed from the release paper. Next, the sample was weighed to the nearest 0.0001 gram, as were the boiling flask and boiling chips. The Soxhlet apparatus was assembled after placing the sample thimble and 150 ml of tetrahydrofuran (the extraction solvent) in it. The tetrahydrofuran in the extraction apparatus was heated at reflux (about 65° C.), using the heating mantle, for four hours to extract the sample. The solvent was then evaporated, using the rotary evaporator, while heating the flask with a hot water bath. The boiling flask, boiling chips, and extracted sample were then weighed, and the weight of the flask and boiling chips alone was subtracted to provide the weight of material extracted from the sample. The weight of material extracted was divided by the original sample weight to provide the fraction of material extracted. This value was subtracted from 1 to provide the gel fraction.

Table II sets forth the gel fraction determined for the indicated polyurethane resins of Examples 1-17.

TABLE II

| Example | Gel Fraction |
|---|---|
| 1 | .838 |
| 2 | .756 |
| 3 | .828 |
| 4 | .699 |
| 5 | .857 |
| 6 | .868 |
| 7 | .738 |
| 8 | .479 |
| 9 | .526 |
| 10 | .677 |
| 11 | — |
| 12 | — |
| 13 | — |
| 14 | .708 |
| 15 | .943 |
| 16 | .642 |
| 17 | .92 |

MECHANICAL PROPERTIES OF CROSSLINKED POLYMER FILMS

For each crosslinked polymer sample prepared as described below, the Young's Modulus, the forces required for 100%, 200%, and 300% elongation, and the ultimate strength and elongation of the sample at breaking were determined during a single procedure.

The equipment used in this test method included an Instron machine (table model), a 15 mil (0.38 mm) wet drawdown bar, and a size "C" (ASTM D412-66T) dumbbell die. The resin to be tested was dissolved in three times its weight of dimethylformamide, then coated onto release paper at a wet thickness of 15 mils (0.38 mm) using the drawdown bar. The coating and release paper were heated in a forced air oven at 60° C. and the temperature of the oven was raised to 100° C. and maintained at that level for one hour. Each sample was then crosslinked by exposing it to 7.0 Mrads of electron beam radiation.

For the Young's Modulus test the coating was then inspected, all imperfections, such as air bubbles, dirt particles, and the like were marked, and the samples were conditioned at 23° C. (±2) and 50±5% relative humidity for not less than 40 hours prior to testing. Samples for the other tests were prepared subsequent to crosslinking by placing them in a desiccator for 24 hours, followed by inspection of the sample and marking of any imperfections. Test samples were cut from the film using the dumbbell die, being sure to avoid any imperfections.

The sample was secured in the Instron machine, which was set to provide a test speed of 2 inches (5.1 cm) per minute, a chart speed of 1 inch (2.5 cm) per minute, and a gauge length (portion of the sample marked before starting the Instron machine) of 1.25 inches (3.18 cm) ±0.01 inches (0.25 mm). The sample was measured for thickness in the test area. The Instron was then started, and a recording of the tensile stress versus tensile strain was made at the prescribed conditions. The test was continued until the sample broke, and at least ten tests were run on the material of each example.

The following set-up conditions were followed or measurements were made for each Instron sample:

$F_B$ = force at break;
$T_s$ = thickness of the sample;
$W_s$ = width of sample = 0.25 inches (6.35 mm) +0.002(0.051 mm) −0.000;
$L_B$ = elongation at break;
$L_o$ = original gauge length = 1.25 inches (1.18 cm);
$F_{100}$ = force at 100% elongation;
$F_{200}$ = force at 200% elongation; and
$F_{300}$ = force at 300% elongation.

For the Young's Modulus measurements, a somewhat different Instron set-up and sample were used. For these measurements the Instron was set up to have a gauge length of 10.0 inches (25.4 cm) ±0.01 inches(0.25 mm); a crosshead speed of 1 inch (2.54 cm) per minute and a chart speed of 20 inches (50.8 cm) per minute. In this instance a sample cutter Model JDC-25, provided by Thwing-Albert Instrument Company, Philadelphia; Pennsylvania was used to cut a sample 1.0±0.01 (0.25 mm) inches wide and a minimum of 11 inches long. The procedure was otherwise as for the other mechanical measurements.

To determine the Young's Modulus of each sample the Instron stress-strain curve was examined and a tangent was drawn to the initial linear portion of the curve which indicated the point at which an increase in stress occurred without a corresponding increase in strain. The stress and strain for some point on this tangent line was then determined, and the stress was divided by the strain to provide the Young's Modulus.

The forces at 100%, 200%, and 300% elongation were reported directly for each test specimen.

Ultimate strength and elongation are the values reported when the sample broke in the Instron machine.

Table III sets forth the mechanical properties determined for the indicated polyurethane resins of Examples 1-21. ("E" is elongation).

TABLE III

| | (English Units) | | | | | |
|---|---|---|---|---|---|---|
| Example | Young's Modulus (psi) | Ultimate Strength (psi) | Ultimate Elongation (psi) | Force (psi) 100% | Force (psi) 200% | Force (psi) 300% |
| 1 | 60432 | 7988 | 243 | 5068 | 6575 | — |
| 2 | 97860 | 8129 | 206 | 6207 | 8042 | — |
| 3 | 111441 | 7200 | 44 | — | — | — |
| 4 | 57043 | 7488 | 221 | 4978 | 7044 | — |
| 5 | 96737 | — | — | — | — | — |
| 6 | 102214 | 8925 | 212 | 6590 | 8492 | — |
| 7 | 129665 | 3269 | 112 | 3243 | — | — |
| 8 | 106209 | 9230 | 183 | 7364 | — | — |
| 9 | 121782 | 8711 | 112 | 8400 | — | — |
| 10 | 89535 | 6813 | 156 | 6000 | 6625 | — |
| 14 | 1049 | 9312 | 410 | 1133 | 2228 | 5200 |
| 15 | 2813 | 8125 | 185 | 4148 | — | — |
| 16 | 996 | 8754 | 418 | 1083 | 2395 | 5129 |
| 17 | 3102 | 6915 | 175 | 3808 | — | — |

TABLE III

| | (Metric Units) | | | | |
|---|---|---|---|---|---|
| | Young's Modulus | Ultimate Strength | Force | | |
| Example | (N/m²) | (N/m²) | 100% E N/m² | 200% E N/m² | 300% E N/m² |
| 1 | 41668 | 5508 | 3494 | 4533 | — |
| 2 | 67474 | 5605 | 4280 | 5545 | — |
| 3 | 76839 | 4964 | — | — | — |
| 4 | 39331 | 5163 | 3432 | 4857 | — |
| 5 | 6672 | — | — | — | — |
| 6 | 70477 | 6154 | 4544 | 5855 | — |
| 7 | 89404 | 2254 | 2236 | — | — |
| 8 | 73231 | 6364 | 5077 | — | — |
| 9 | 83969 | 6006 | 5792 | — | — |
| 10 | 61734 | 4698 | 4137 | 4568 | — |
| 14 | 723 | 6421 | 781 | 1536 | 3585 |
| 15 | 1940 | 5602 | 2860 | — | — |
| 16 | 687 | 6036 | 747 | 1651 | 3536 |
| 17 | 2139 | 4768 | 2626 | — | — |

THERMONECHANICAL PROPERTIES OF CROSSLINKED POLYMER FILMS

This method was used to determine the glass transition temperature ($T_g$) and flow temperature (FT) of crosslinked polyurethane resins by thermomechanical analysis. The sample was heated in a thermomechanical analyzer equipped with a penetration probe. The resulting thermogram showed a relatively small amount of penetration at the glass transition temperature. At the softening point penetration resumed and continued at an increasing rate. The temperature at which the rate of penetration becomes constant was recorded as the flow temperature. The following apparatus was assembled:

A. Perkin-Elmer Model TMS-1 Thermomechanical Analyzer.
B. Perkin-Elmer Model UU-1 Temperature Program control.
C. Penetration probe with a 0.018″ (0.46 mm) radius ball
D. Hewlett Packard Model 7000A X-Y Recorder (or comparable model).
E. #5 cork borer, hydraulic press or cork boring machine, forceps.
F. Coolant capable of producing a temperature 20°-30° below the glass transition temperature.
G. Helium.

The samples were molded as described previously, forming hot pressed plugs 1¼″ (3.18 cm) diameter by 1/16 (1.59 mm) to ⅛″ (3.2 mm) thick. A ¼″ (6.35 mm) diameter section was cut out with the cork borer and placed on the sample platform of the TMS-1. The sample was then heated to 150° C. at the maximum rate (320° C./minute). After 5 minutes at 150° C. the sample was cooled to a temperature at least 20-30° C. below the expected glass transition temperature. This heating cycle relieved stresses in the sample that could cause erratic results The helium pressure supplied to the TMS-1 to isolate the specimen from atmospheric gases was set to provide a flow rate of 30-50 ml./minute through the sample tube.

The TMS-1 was operated under the following conditions:
1. Heating Rate—5° C./minute.
2. X-axis (temperature)—20° C./inch (7.9° C. per cm) (TMS-1 Temperature span 100°/minute, Recorder—0.2 mv/inch 0.079 mv/cm)
3. Y-axis (penetration)—$10^{-3}$ inches penetration/inch along axis (same value in mm/mm) (TMS-1 Sensitivity 2, Recorder 0.5 mv/inch) (1.97 mv/cm)
4. Load on penetration probe - 2 gm. (in addition to the weight needed to offset the bouyancy of the probe).

The recorder was set so zero penetration fell in the upper third of the chart. The probe was lowered onto the sample and heating was initiated. Heating was stopped when it was apparent that a constant rate of penetration had been reached. Recorder zero was changed during the run to accommodate the entire thermogram at the suggested y-axis sensitivity.

There were two areas of interest in the thermogram that are described below.

The glass transition temperature ($T_g$) is the temperature at which a polymer changes from a glassy to a rubbery state. It was seen in the thermogram as a relatively small amount of penetration followed by reestablishment of a baseline. $T_g$ was reported as the temperature at the intersection of tangents drawn to straight line portions of the curve before and after the onset of penetration.

The flow temperature (FT) is the temperature at which the rate of penetration becomes constant. It was reported as the temperature at which a tangent drawn to the final portion of the curve deviated from the curve. The following table sets forth the glass transition temperatures and flow point temperatures for the indicated polyurethane resins of Examples 1-17.

TABLE IV

| Sample | Glass Transition Temperature, °C. | Flow Temperature, °C. |
|---|---|---|
| 1 | 30 | 184 |
| 2 | 20 | 216 |
| 3 | 47 | 232 |
| 4 | 40 | 202 |
| 5 | 37 | 222 |
| 6 | 53 | 187 |
| 7 | 62 | 216 |
| 8 | 68 | 187 |
| 9 | 47 | 202 |
| 10 | 46 | 212 |
| 11 | — | — |
| 12 | — | — |
| 13 | — | — |
| 14 | 7 | 212 |
| 15 | 8 | 226 |
| 16 | 9 | 206 |
| 17 | 9 | 225 |

MOLECULAR WEIGHT OF UNCROSSLINKED POLYMER SAMPLES

The weight average molecular weight and the number average weight of each of the examples of preparation of a polymer were determined using a Model 200 GPC analyzer sold by Waters Associates, Milford, Massachusetts. The columns employed were those of those of sets A and B (300,00 angstroms, 100,000 angstroms, 30,000 angstroms (2), 10,000 angstroms, 1,000 angstroms, 500 angstroms and 200 angstroms). The polymers were dissolved at a concentration of 0.25% in tetrahydrofuran. Control polystyrene standards provided by Waters Associates were also run through the columns to provide a comparison. Using a computerized protocol calculations of number average molecular weight, weight average molecular weight, and molecular weight distribution were made. The following table sets forth the values determined for the indicated polyurethane resins of Examples 1-17.

TABLE V

| Sample | WAMW[1] | NAMW[2] | MWD[3] |
|---|---|---|---|
| 1 | 125,306 | 45,757 | 2.8 |
| 4 | 112,337 | 33,971 | 3.1 |
| 6 | 138,301 | 43,386 | 3.5 |
| 8 | 124,167 | 43,320 | 2.8 |
| 10 | 184,294 | 41,000 | 6.0 |
| 14 | 110,206 | 37,911 | 2.5 |
| 16 | 105,663 | 32,424 | 2.6 |

The superscripts in the above table have the following meaning:
1. Weight-average molecular weight
2. Number-average molecular weight
3. Molecular weight distribution

MECHANICAL PROPERTIES OF MAGNETIC TAPE COATINGS (UNCROSSLINKED)

Magnetic tape coatings were prepared by charging the following ingredients in the proportions stated below into a 1000 ml Lumard ceramic jars containing 2500 grams of ⅜" (0.95 cm) steel balls:
solvent (or solvents)
wetting agent
lubricant The Lumard ceramic jars were then sealed and allowed to grind for 30 hours at 112 revolutions per minute (RPM). Dispersions were evaluated microscopically to assess quality of the grind. When the grinds reached the required quality the polyurethane resin of the present invention was added as a 20% solution in tetrahydrofuran. Thereafter, the dispersions were mixed for an additional four hours at 112 RPM. The proportions of oxide and polyurethane resin were varied to provide oxide:resin weight ratios of 3:1 or 5:1 as desired.

The following two formulations were used to prepare oxide polyurethane dispersions of some of the polyurethane resins of Examples 1-17, having oxide:resin ratios of 3:1 and 5:1 respectively.

| Coating A | |
|---|---|
| Oxide:Resin 3:1 | wt (grams) |
| Magnetic iron oxide | 150 |
| Tetrahydrofuran | 96 |
| Toluene | 64 |
| Wetting Agent | 4.0 |

Coating A

| Oxide:Resin 3:1 | wt (grams) |
| --- | --- |
| Isocetyl Stearate | 1.0 |
| Polyurethane resin solution | 250 |

Coating B

| Oxide:Resin 5:1 | wt (grams) |
| --- | --- |
| Magnetic iron oxide | 150 |
| Tetrahydrofuran | 96 |
| Toluene | 64 |
| Wetting Agent | 4.0 |
| Isocetyl Stearate | 1.0 |
| Polyurethane resin solution | 150 |

Each finished dispersion was then filtered and coated onto a suitable release paper, using a laboratory coater having fixed gaps of 10, 15, and 20 mils respectively. After the solvents were evaporated the dried samples were placed in a desiccator for 24 hours. Test samples were cut from the coated release paper, and used for tensile strength measurements. Tensile strength measurements were carried out in accordance with the procedure set forth previously in the discussion of resin mechanical properties. The following table VI sets forth the mechanical properties obtained for magnetic coatings made from the polyurethane resins of Examples 1-17.

TABLE VI (English UNits)

| | Oxide/Resin 3:1 by wt. | | Oxide/Resin 5:1 by wt | |
| --- | --- | --- | --- | --- |
| Example | Young's Modulus (psi) | Ultimate Tensile Strength (psi) | Young's Modulus (psi) | Ultimate Tensile Strength (psi) |
| 1 | 311,603 | 1900 | 284,648 | 2722 |
| 2 | 381,708 | 1824 | 374,747 | 3081 |
| 3 | 508,905 | 1900 | 449,673 | 2680 |
| 4 | 434,942 | 2832 | 374,738 | 4510 |
| 5 | 601,195 | 1934 | 455,708 | 3086 |
| 6 | 669,112 | 3188 | 840,349 | 5522 |
| 7 | 615,940 | 2196 | 931,607 | 2335 |
| 8 | 588,855 | 1320 | 937,683 | 2455 |
| 9 | 672,490 | 1528 | 814,899 | 2622 |
| 10 | 548,473 | 2194 | 692,437 | 4465 |
| 14 | 126,150 | 980 | 193,500 | 1997 |
| 15 | 115,858 | 1478 | 95,488 | 1702 |
| 16 | 119,318 | 1221 | 80,522 | 1724 |
| 17 | 120,745 | 1497 | 168,724 | 1847 |

TABLE VI (Metric Units)

| | Oxide:Resin = 3:1 | | Oxide/Resin = 5:1 | |
| --- | --- | --- | --- | --- |
| Example | Young's Modulus (N/m$^2$) | Ultimate Tensile Strength (N/m$^2$) | Young's Modulus (N/m$^2$) | Ultimate Tensile Strength (N/m$^2$) |
| 1 | 214,850 | 1310 | 196,265 | 1877 |
| 2 | 263,188 | 1258 | 258,388 | 2124 |
| 3 | 350,890 | 1310 | 310,050 | 1848 |
| 4 | 299,893 | 1953 | 258,382 | 3110 |
| 5 | 414,524 | 1333 | 314,211 | 2128 |
| 6 | 461,352 | 2198 | 579,421 | 3807 |
| 7 | 424,691 | 1514 | 642,343 | 1610 |
| 8 | 406,016 | 910 | 646,532 | 1693 |
| 9 | 463,682 | 1054 | 561,873 | 1808 |
| 10 | 378,172 | 1513 | 477,435 | 3079 |
| 14 | 86,980 | 676 | 133,418 | 1377 |
| 15 | 79,884 | 1019 | 65,839 | 1174 |
| 16 | 83,254 | 1032 | 55,520 | 1189 |
| 17 | 83,254 | 1032 | 116,335 | 1274 |

SOLUBILITY OF CROSSLINKED MAGNETIC COATINGS

Polyurethane dispersions having oxide:resin weight ratios of 1 and 5:1 respectively were prepared as described in the preceding section. Each of these dispersions was coated onto polyester film to provide a magnetic oxide coated film (magnetic tape). These magnetic tapes were then exposed to 7.0 Mrads. of EB irradiation to cause crosslinking. The solubility characteristics were determined in accordance with the procedure set forth previously for the crosslinked resin solubility determinations. The following table VII sets forth the gel fractions determined for the indicated magnetic tape coatings prepared from the polyurethane resins of Examples 1-17.

TABLE VII

| | Gel Fraction | |
| --- | --- | --- |
| Example | 3:1 | 5:1 |
| 1 | .918 | .87 |
| 2 | .902 | .875 |
| 3 | .877 | .835 |
| 4 | .882 | .877 |
| 5 | .893 | .818 |
| 6 | .857 | .865 |
| 7 | .851 | .822 |
| 8 | .853 | .883 |
| 9 | .878 | .847 |
| 10 | .865 | .85 |
| 14 | .876 | .836 |
| 15 | .902 | .819 |
| 16 | .887 | .841 |
| 17 | .893 | .831 |

BLOCKING TEST

Layer to layer adhesion of magnetic tape wound on a reel, commonly known as "blocking", can occur during magnetic tape processing or in the final consumer reels of tape. Higher than normal heat or humidity will promote blocking.

First, magnetic coatings based on each of the examples were prepared, then coated at a wet thickness of 0.5 to 1.0 mils (12.7-25.4 microns) on an 88 gauge (0.88 mils, 22 microns) polyester backing 6 inches (15 cm) wide, to form a magnetic tape such as is commonly used in reel to reel recorders. The dry coating thickness was about 200-300 micro inches (5-8 microns). The coatings were crosslinked by exposure of the reels to 7 Mrads. of electron beam radiation.

The samples used for testing were strips of tape approximately 50 inches (1.27 meters) long and 0.25 inches (6.35 mm) wide. A short adhesive tape was used to attach one end of the sample to a glass spindle 20 cm long by 1.6 cm in diameter. Appropriate weights (600 grams for the dry test, 300 grams for the humid test) were added to the free ends of the tapes to provide the necessary tension. Each tape was wound upon itself, and when fully wound up to the weight, the tape was held in place, the weight was removed, and the free end was secured with another adhesive tab. At no time was the tension lost.

The 150° F. and 185° F. "dry" samples were maintained at 85° C. in a forced air oven for 20 hours. The "humid" samples were maintained at 65° C., 100% relative humidity for 20 hours. After 20 hours, all samples were removed from the ovens and allowed to cool to room temperature.

When cool, the adhesive tab of a sample was removed, then the sample was graded from 1 to 7 according to its degree of blocking, using the following scale:

1. The tape springs off or will fall freely when the spindle is held in a vertical position.
2. The tape will not fall freely in a vertical position but
   will unwind easily with no trace of layer to layer adhesion
   when the spindle is rotated while horizontal.
3. Tape unwinds under its own weight when the horizontal
   spindle is rotated, but slight layer to layer adhesion will
   cause it to cling slightly along the curvature of the spindle.
4. The tape does not unwind by itself when the horizontal
   spindle is rotated, but only a negligible force will be required to unwind it.
5. A noticeable force is required to remove the tape.
6. Slight delamination occurs in spots as tape is unwound.
7. Severe delamination occurs during unwinding.

The blocking values obtained for the resins of Examples 1-17 follow in Table VIII.

6. Slight delamination occurs in spots as tape is unwound.
7. Severe delamination occurs during unwinding.

The blocking values obtained for the resins of Examples 1-17 follow in Table VIII.

TABLE VIII

| | Blocking Characteristics | | | |
| --- | --- | --- | --- | --- |
| | 65° C. (Humid) | | 85° C. (Dry) | |
| Example | 3:1 | 5:1 | 3:1 | 5:1 |
| 1 | 4.0 | 4.0 | 4.0 | 4.0 |
| 2 | 3.0 | 3.0 | 4.0 | 4.0 |
| 3 | 3.0 | 2.0 | 3.0 | 3.0 |
| 4 | 4.0 | 4.0 | 6.0 | 4.0 |
| 5 | 4.0 | 3.0 | 4.0 | 4.0 |
| 6 | 3.0 | 2.0 | 4.0 | 3.0 |
| 7 | 3.0 | 2.0 | 3.0 | 3.0 |
| 8 | 2.0 | 3.0 | 3.0 | 3.0 |
| 9 | 3.0 | 3.0 | 4.0 | 3.0 |
| 10 | 4.0 | 4.0 | 4.0 | 4.0 |
| 14 | 4.0 | 4.0 | 4.0 | 5.0 |
| 15 | 3.0 | 3.0 | 4.0 | 4.0 |
| 16 | 4.0 | 4.0 | 5.0 | 4.0 |
| 17 | 3.0 | 3.0 | 4.0 | 4.0 |

What is claimed is:

1. A substantially uncrosslinked, electron beam crosslinkable polyurethane resin which is the reaction product of:

A. from about 34% to about 75% by weight of hydroxyl terminated polyester which is a reaction product of an alpha-omega dicarboxylic acid and a lower alkyl diol;

B. from about 5% to about 22% by weight of an unsaturated compound having a structure selected from:

Structure I
   $$R^4-\underset{R^3}{\overset{R^1}{\underset{|}{\overset{|}{C}}}}-R^2H$$

Structure II
   $$R^4-\underset{R^3}{\overset{R^1}{\underset{|}{\overset{|}{C}}}}-R^2\overset{O}{\overset{\|}{C}}NHR^5NH\overset{O}{\overset{\|}{C}}-R^2-\underset{R^3}{\overset{R^1}{\underset{|}{\overset{|}{C}}}}-R^4$$

wherein $R^1$ is a moiety having the structure:

$-(CH_2)_xOH$, $R^2$ is a moiety having the structure:

$-(CH_2)_xO-$ wherein the oxygen atom is part of a carbamate linkage in Structure II,
   $x_3$ can be 0, 1, or 2,
   $R^3$ is a moiety having the structure:

$$CH_2=\underset{|}{\overset{R^4}{C}}(CH_2)_y-(T)_z-(CH_2)_w-$$

T is selected from carbonyl and ether linkages,
   y is 0 or 1,
   z is 0 or 1,
   w is 0, 1, or 2,
   $R^4$ is selected from $-H$ and $-CH_3$, or $R^3$ and $R^4$ together form a divalent ring-forming moiety having the structure $$-(CH_2)_rCH=\underset{|}{\overset{R^2}{C}}-(CH_2)_s-$$

wherein
   r and s are independently 0, 1, 2, or 3, and
   $R^5$ is an aliphatic hydrocarbon moiety having from about 6 about 36 carbon atoms; and C. from about 18% to about 44% by weight of an organic diisocyanate.

2. The resin of claim 1, further comprising:
   D. a diol chain extender.

3. The resin of claim 2, wherein said component A has a hydroxyl number range of from about 30 to about 300; the combination of said components A and B has a hydroxyl number range of from about 100 to about 350; and the combination of said components A, B, and D has a hydroxyl number range of from about 100 to about 350.

4. The resin of claim 2, wherein the number of equivalents of reactive hydroxyl moieties in the combination of said components A, B, and D is substantially equal to the number of equivalents of reactive isocyanate moieties in said components C.

5. The resin of claim 1, wherein said component A is the reaction product of:
   A. a diol selected from 1,4-cyclohexane-dimethanol and 1,4-butanediol; and
   B. a dicarboxylic acid having the structure:

$HOOC-(CH_2)_b-COOH$ wherein b is between about 4 and about 10, inclusive.

6. The resin of claim 5, wherein said dicarboxylic acid is selected from:
   adipic acid;
   azelaic acid; and
   1,12-dodecanedioic acid.

7. The resin of claim 2, wherein said component B is selected from the group consisting of:
   glyceryl allyl ether; and
   compounds having the structure:

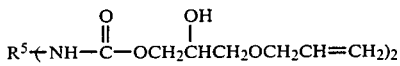

wherein $R^5$ is a 36-carbon hydrocarbon radical which is the aliphatic nucleus of a diisocyanate-terminated dimer of oleic acid.

8. The resin of claim 1, wherein said component C is selected from:
 methylene-bis-diphenyl diisocyanate;
 tetramethylene diisocyanate;
 hexamethylene diisocyanate;
 cyclohexyl diisocyanate;
 phenyl diisocyanate;
 toluene diisocyanate;
 dichlorodiphenylmethane diisocyanate;
 dimethyldiphenylmethane diisocyanate;
 diphenyldimethylmethane diisocyanate;
 dibenzyl diisocyanate; and
 diphenyl ether diisocyanate.

9. The resin of claim 2, wherein said component D is selected from the group consisting of:
 ethylene glycol;
 propylene glycol;
 1,4-butanediol;
 1,3-butanediol;
 1,5-pentanediol;
 1,6-hexanediol;
 1,4-cyclohexanedimethanol; and
 hydroquinone di(beta-hydroxyethyl) ether.

10. The resin of claim 9, co-reacted with a urethane acrylate product obtained from the reaction of trimethylolpropane, toluene diisocyanate and 2-hydroxyethyl acrylate.

11. The resin of claim 2, wherein said component A is the reaction product of 1,4-cyclohexanedimethanol with a mixture of adipic and azelaic acids, said component B is the reaction product of glyceryl allyl ether with the aliphatic diisocyanate derived from the dimer of oleic acid, said component D is 1,4-butanediol and said component C is methylene-bis-diphenyl diisocyanate.

12. The resin of claim 2, wherein said component A is the reaction product of 1,4-cyclohexanedimethanol with azelaic acid, said component B is the reaction product of glyceryl allyl ether with the aliphatic diisocyanate derived from the dimer of oleic acid, said component D is 1,4-butanediol and said component C is methylene-bis-diphenyl diisocyanate.

13. The resin of claim 2, wherein said component A is the reaction product of 1,4-cyclohexanedimethanol with a mixture of azelaic and 1,12-dodecanedioic acids, said component B is the reaction product of glyceryl allyl ether with the aliphatic diisocyanate derived from the dimer of oleic acid, said component D is 1,4-butanediol, and said component C is methylene-bis-diphenyl diisocyanate.

14. The resin of claim 2, wherein said component A is the reaction product of 1,4-cyclohexanedimethanol with a mixture of adipic and azelaic acids, said component B is glyceryl allyl ether, said component D is 1,4-butanediol and said component C is methylene-bis-diphenyl diisocyanate.

15. The resin of claim 2, wherein said component A is the reaction product of 1,4-butanediol with adipic acid, said component B is glyceryl allyl ether, said component D is 1,4-butanediol and said component C is methylene-bis-diphenyl diisocyanate.

16. The resin of claim 2, wherein said said component A is the reaction product of 1,6-hexanediol with adipic acid, said component B is glyceryl allyl ether, said component D is 1, 4-butanediol and said component C is methylene-bis-diphenyl diisocyanate.

17. A polyurethane resin mixture comprising:
 A. from about 50% to about 98% by weight of the resin of claim 1; and
 B. from about 2% to about 50% of a urethane acrylate product obtained by reacting trimethylolpropane, toluene diisocyanate, and 2-hydroxyethyl acrylate.

18. A polyurethane resin mixture comprising:
 A. from about 50% to about 98% by weight of the resin of claim 11; and
 B. from about 2% to about 50% of a urethane acrylate product obtained by reacting trimethylolpropane, toluene diisocyanate, and 2hydroxyethyl acrylate.

19. A polyurethane resin mixture comprising:
 A. from about 50% to about 98% by weight of the resin of claim 15; and
 B. from about 2% to about 50% by weight of a urethane acrylate product obtained by reacting trimethylolpropane, toluene diisocyanate, and 2-hydroxyethyl acrylate.

* * * * *